Figure 1:
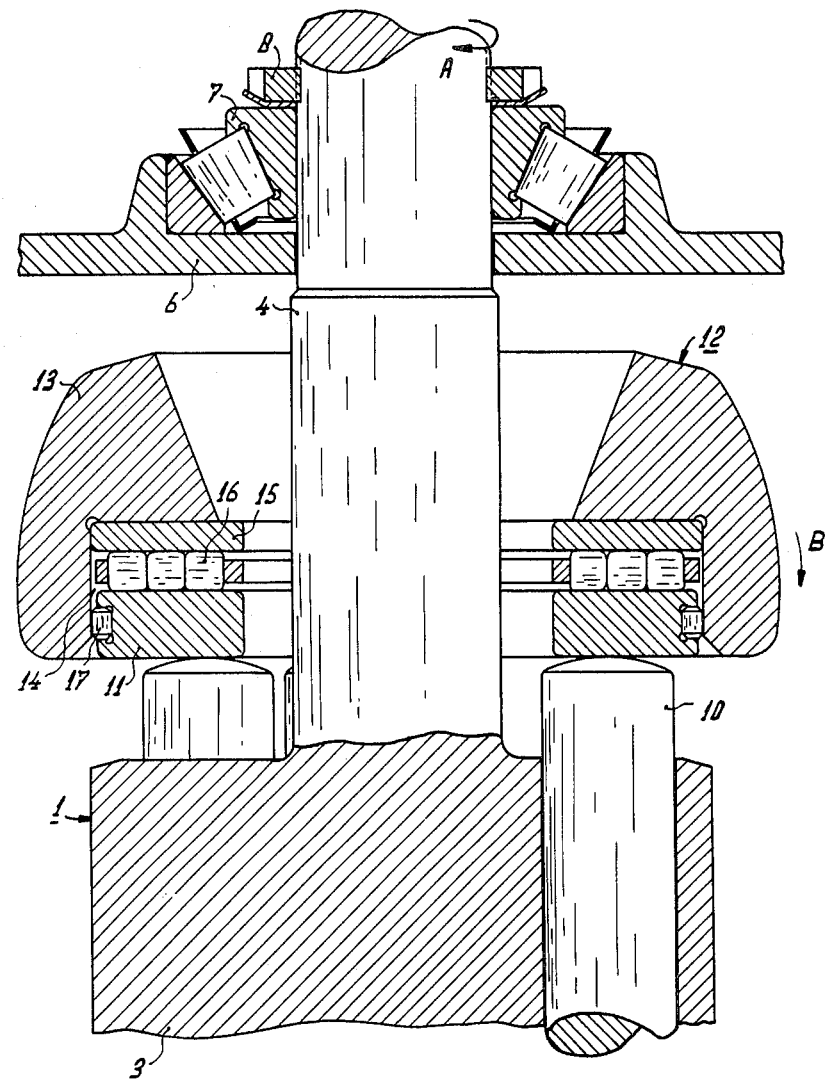

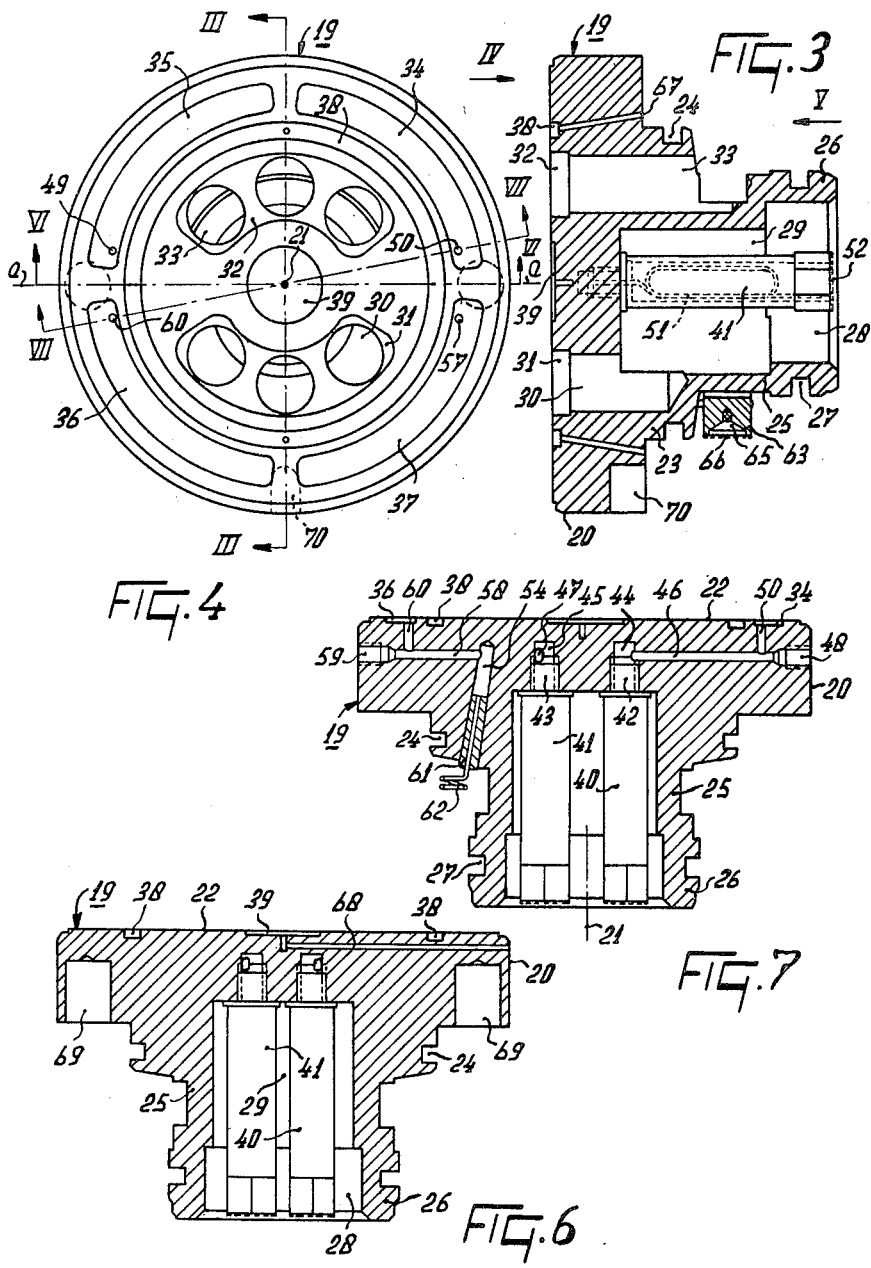

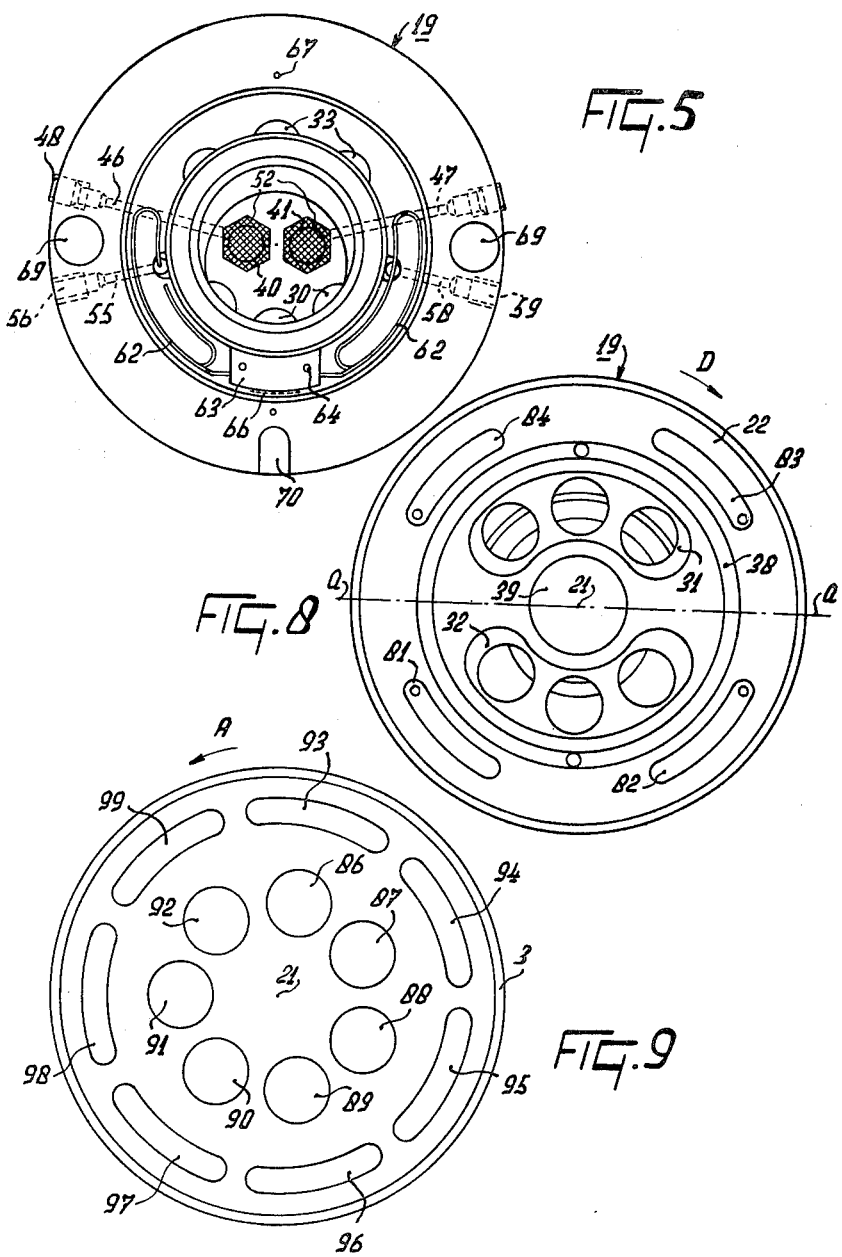

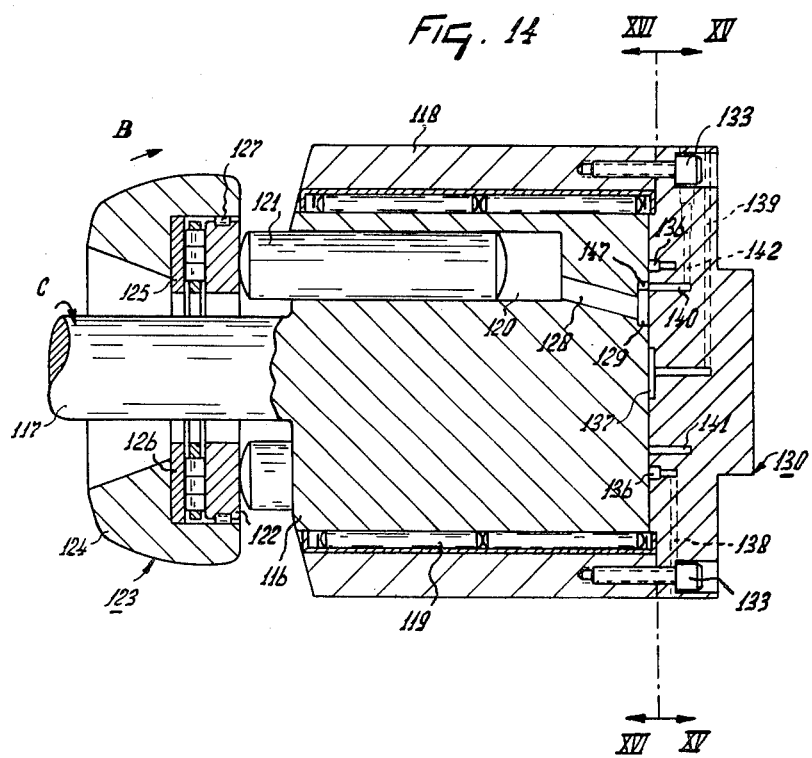

Feb. 1, 1966  C. O. JONKERS ETAL  3,232,239
HYDRAULIC PUMPS AND MOTORS
Filed Jan. 10, 1963  8 Sheets-Sheet 8

INVENTORS
C. O. JONKERS
F. H. FOCKENS
BY
Mason, Mason & Albright
Attorneys

United States Patent Office 3,232,239
Patented Feb. 1, 1966

3,232,239
HYDRAULIC PUMPS AND MOTORS
Cornelius Otto Jonkers, Delft, and Foppe Hilbertus Fockens, Maasland, Netherlands, assignors to C. van der Lely N.V., Maasland, Netherlands, a Dutch limited-liability company
Filed Jan. 10, 1963, Ser. No. 250,595
Claims priority, application Netherlands, Jan. 26, 1962, 274,075, 274,076; Oct. 11, 1962, 284,266
33 Claims. (Cl. 103—162)

This invention relates to hydraulic pumps and motors of the kind comprising a housing formed with a number of chambers each containing an axially movable piston or plunger arranged to directly or indirectly contact a swash plate and also a port plate, said housing and port plate being formed with surfaces which are adapted to contact or lie in relatively close proximity to one another and being arranged to be relatively rotatable about an axis extending transverse to said surfaces.

An object of the invention is the provision of simple and efficient hydraulic pumps and motors in which the danger of damage due to unlubricated contact occuring during operation is avoided or substantially reduced.

According to the invention, there is provided a hydraulic pump or motor of the kind set forth, wherein the surfaces are arranged so as to be movable relative to one another, the surface of the port plate being formed with at least two ports which are arranged substantially symmetrically on opposite sides of a plane containing the axis of rotation, the arrangement being such that, during operation, the port(s) on one side of said plane contain(s) liquid at a relatively high pressure while the port(s) on the opposite side contain(s) liquid at a relatively low pressure, and wherein at least one recess is formed in one of said surfaces on the same side of said plane as the last-mentioned port(s), the, or each, recess being arranged to be supplied with liquid under pressure during operation of the pump or motor.

This invention relates further to pumps for liquids and to liquid-pressure operated motors of the kind which include a housing and a port plate having surfaces adapted to contact each other or to lie in close proximity, the housing and the port plate being relatively rotatable about an axis extending transverse to said surfaces and the housing being formed with a number of plunger-containing chambers each of which communicates with said surface of the housing.

An object of the invention is the provision of improved pumps and motors of this kind in which the potential energy of some of the liquid compressed during operation is utilised for lubricating purposes.

According to the invention, there is provided a pump or motor of the kind set forth, wherein the port plate has two ports opening onto said surface thereof which ports are located on relatively opposite sides of a plane containing the axis of relative rotation, one port being arranged to hold liquid under a relatively high pressure during operation while the other is arranged to hold liquid under a relatively low pressure, and wherein a duct which opens onto one of said surfaces is so arranged that, during a period in which a chamber is in communication with neither of said ports during operation, the chamber communicates with, and can discharge liquid into, the said duct.

Figure 2:
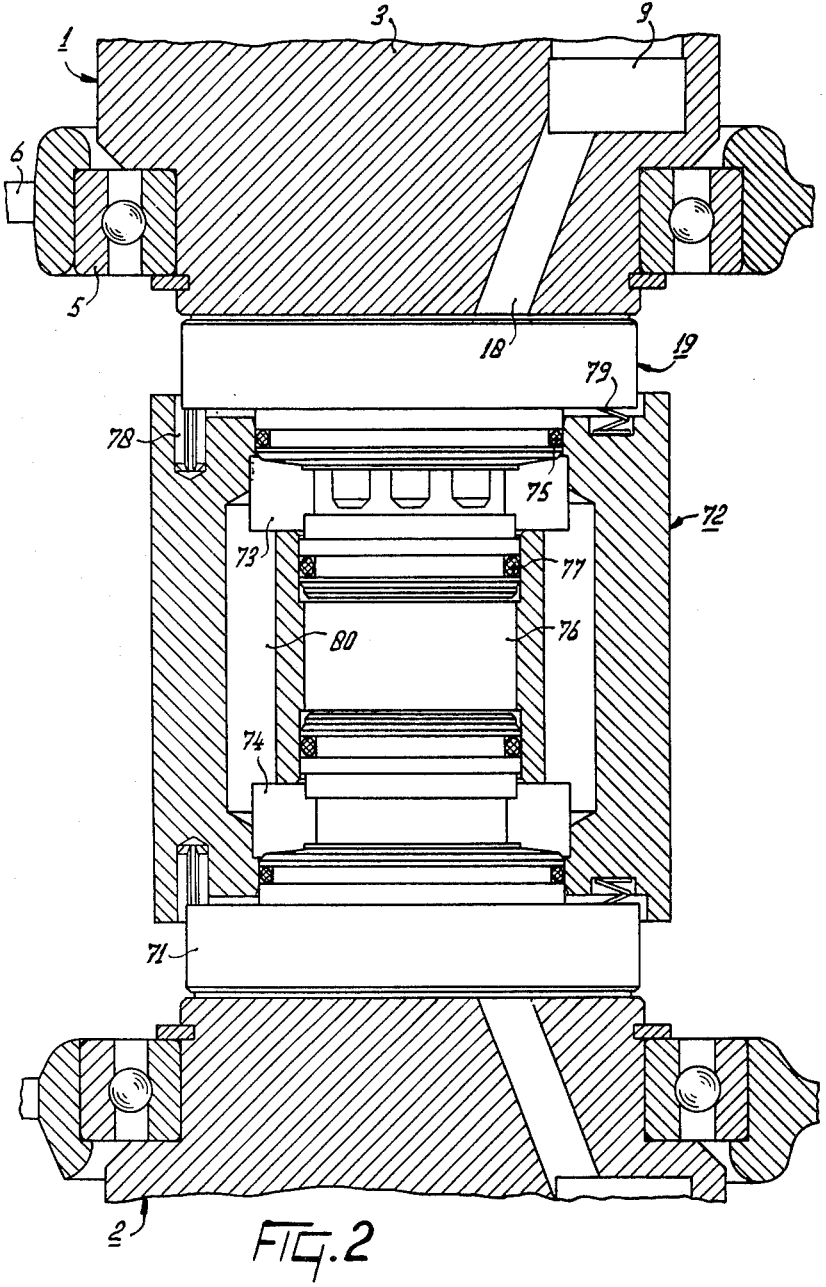
Figure 10:
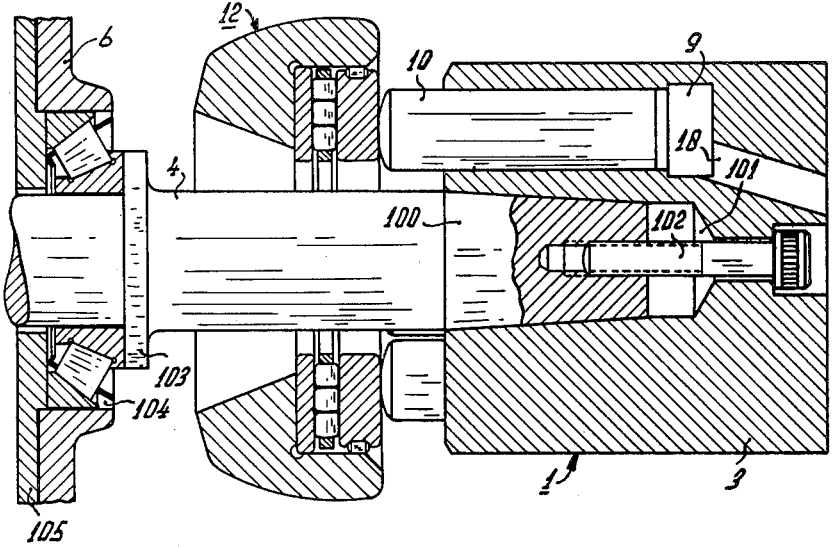
Figure 11:
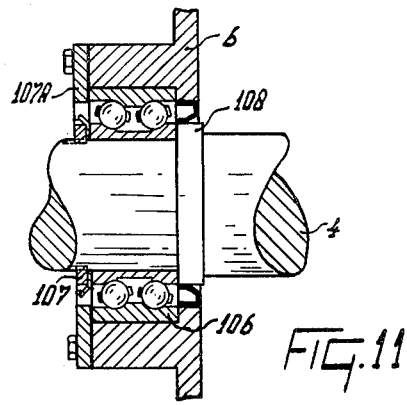
Figure 13:
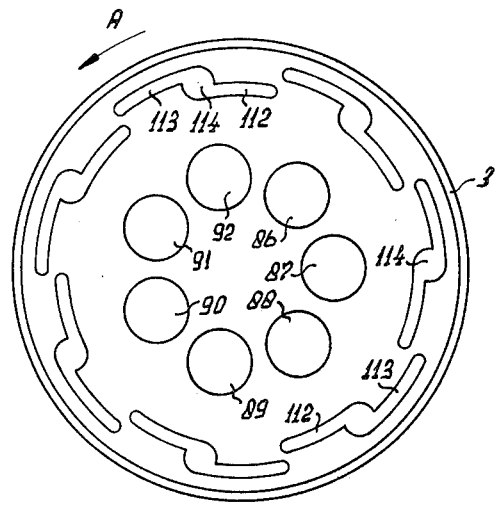
Figure 12:
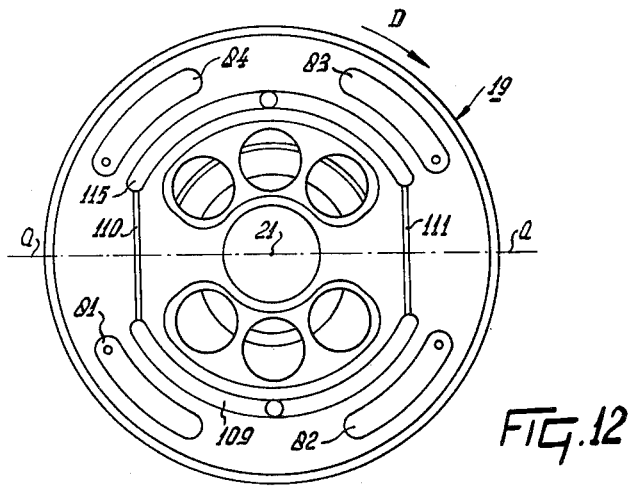

For a better understanding of the invention, and to show how the same may be carried into effect, reference will now be made, by way of example, to the accompanying drawings, in which:

FIGURE 1 is a diagrammatic sectional view showing part of a hydraulic transmission incorporating a hydraulic pump in accordance with the invention, FIGURE 2 is a view similar to FIGURE 1 but showing further parts of the transmission, FIGURE 3 is a sectional elevation of part of the hydraulic transmission taken on the line III—III of FIGURE 4, FIGURE 4 is an end elevation of part of the hydraulic transmission as seen in the direction indicated by the arrow IV of FIGURE 3, FIGURE 5 is an opposite end elevation corresponding to FIGURES 3 and 4 as seen in the direction indicated by the arrow V of FIGURE 3, FIGURE 6 is a section taken on the line VI—VI of FIGURE 4, FIGURE 7 is a section taken on the line VII—VII of FIGURE 4, FIGURE 8 corresponds to FIGURE 4 but shows an alternative embodiment of part of the hydraulic transmission, FIGURE 9 is an end elevation of part of the hydraulic transmission adapted to co-operate with the part illustrated in FIGURE 8, FIGURE 10 corresponds generally to FIGURE 1 but shows an alternative embodiment, FIGURE 11 illustrates an alternative arrangement for rotatably supporting one of the members illustrated in both FIGURES 1 and 10, FIGURE 12 corresponds to FIGURES 4 and 8 but shows a further alternative embodiment, and FIGURE 13 corresponds to FIGURE 9 but shows an alternative embodiment adapted to co-operate with the part illustrated in FIGURE 12.

Figure 15:
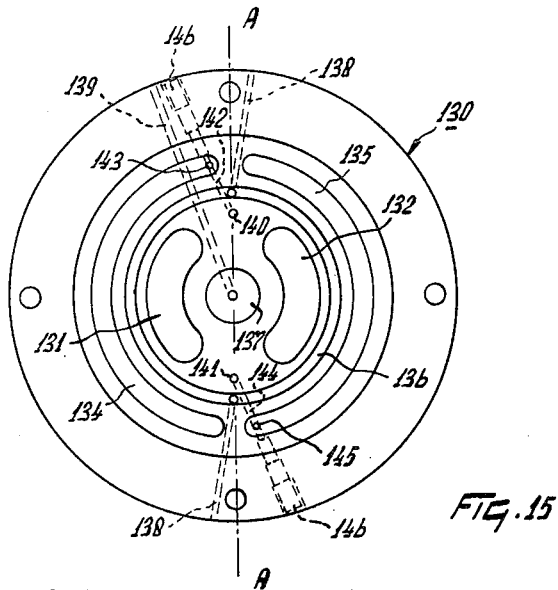
Figure 17:
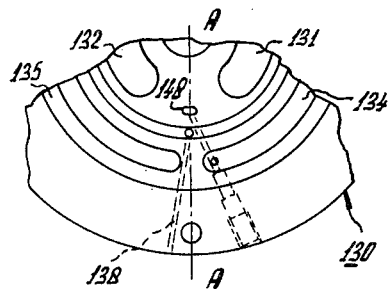
Figure 16:
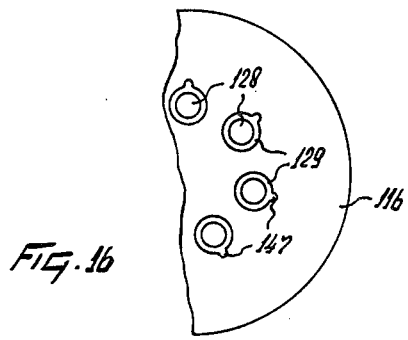

FIGURE 14 is a sectional side elevation of a pump in accordance with the invention, FIGURE 15 is a section taken on the line XV—XV of FIGURE 14, FIGURE 16 is a section taken on the line XVI—XVI of FIGURE 14, and FIGURE 17 is a scrap view corresponding to FIGURE 15 but showing an alternative embodiment of certain parts.

Referring to the drawings, the variable hydraulic transmission which is illustrated includes a liquid pump generally indicated by the reference numeral 1 (FIGURES 1 and 2), and a fluid pressure operated motor 2 (FIGURE 2). Since the pump 1 and motor 2 are of substantially identical construction, only the pump 1 will be described in detail.

The pump 1 has a rotatable housing 3 which is integral with, or rigidly secured to, a shaft 4. The end of the housing 3 remote from the shaft 4 is rotatably connected by a ball race 5 (FIGURE 2) to part of a relatively stationary frame 6. The shaft 4 is rotatably connected by a conical roller bearing 7 to a further part of the frame 6. The bearing 7 is enclosed between said part of the frame 6 and a nut 8 which is mounted on a screwthreaded portion of the shaft 4 located at the end thereof remote from the housing 3. The housing 3 is formed with seven cylindrical bores or chambers 9, said chambers extending parallel to the longitudinal axis of the shaft 4 and being disposed at equal distances from that axis. Moreover, the seven chambers 9 are regularly spaced around said axis. Each chamber 9 accommodates a corresponding cylindrical piston or plunger 10 the domed head of which projects from one end of the corresponding chamber 9. All seven domed heads are in contact with one side of a ring 11 forming part of a swash plate which is generally indicated by the reference numeral 12.

The swash plate 12 includes a support 13 which is connected to the frame 6 in such a way as to be turnable about an axis intersecting and extending perpendicular to the longitudinal axis of the shaft 4. The connection of the support 13 to the frame 6 is not shown in the drawings. The support 13 is formed with a recess 14 against the base of which abuts a hardened annulus 15. The rear side of the ring 11 bears against the annulus 15 through the intermediary of a series of rollers 16 while its radially outermost edge bears against the cylindrical wall of the recess 14 through the intermediary of a series of rollers 17. The arrangement is such that, when the various parts occupy the positions shown in FIGURE 1 in which the plane which contains all the points of contact between the seven plungers 10 and the ring 11 is disposed perpendicular to the longitudinal axis of the shaft 4, the longitudinal axis of each roller 17 extends parallel to the longitudinal axis of the shaft 4 which axis also affords the axis of rotation of the shaft and the housing 3.

A duct 18 communicates with the end of each bore or chamber 9 remote from the swash plate 12, each duct 18 opening onto a flat surface of the housing 3 which surface is adapted to contact, or to lie in close proximity to, a further flat surface formed on a port plate which is generally indicated by the reference numeral 19 (FIGURE 2). The port plate 19 is shown in detail in FIGURES 3 to 7 of the drawings. It will be apparent from these figures that the port plate includes a generally cylindrical portion 20 the side 22 of which constitutes the aforementioned flat surface adapted to co-operate with the similar flat surface formed on the abutting end of the housing 3. The side 22 extends perpendicular to the longitudinal axis or center line 21 (FIGURE 7) of the port plate 19.

The side of the portion 20 remote from the housing 3 is integrally connected to a further cylindrical portion 23 whose diameter is substantially smaller than the diameter of the portion 20. The portion 23 is formed on its outermost surface with a circular groove 24. The side of the portion 23 remote from the portion 20 is integrally connected to a further cylindrical portion 25 of smaller diameter than both the portions 20 and 23. Moreover, the longitudinal axis of the portion 25 is disposed eccentrically with respect to the line 21. The side of the portion 25 remote from the portion 23 is integrally connected to a still further cylindrical portion 26 whose longitudinal axis coincides with the line 21 and which is formed on its outermost surface with a circular groove 27.

The interior of the port plate 19 is formed with two communicating and relatively eccentric cylindrical bores 28 and 29. The bore 29 communicates by way of three ducts 30, each of which extends parallel to the line 21, with an arcuately curved slot-shaped port 31. The port 31 opens onto the side 22 of the portion 20 and its center of curvature coincides with the line 21. A second port 32, similar to the port 31, opens onto the side 22, the ports 31 and 32 being symmetrical with respect to a plane a—a (FIGURE 4) which contains the line 21. The port 32 communicates by way of three ducts 33, each of which extends parallel to the line 21, with the outermost surface of the port plate 19, said ducts opening onto the outermost surface at the side of the portion 23 remote from the portion 20 (see FIGURE 3).

Four arcuately curved grooves 34, 35, 36 and 37 open onto the side 22 of the portion 20, the center of curvature of all four grooves coinciding with the line 21 and the grooves 34 and 35 being symmetrical with the grooves 36 and 37 relative to the plane a—a. As can be seen in FIGURE 4, the port 32 together with the grooves 34 and 35 are located on one side of the plane a—a whereas the port 31 together with the grooves 36 and 37 is located on the opposite side of said plane. It is also apparent from the same figure that none of the grooves 34 to 37 communicate with one another at the flat surface of the port plate 19 afforded by the side 22. A circular groove 38 is formed in the side 22 between the ports 31 and 32 and the grooves 34 to 37 and also a central recess 39, the centers of curvature of both the groove 38 and the recess 39 coinciding with the line 21.

The bores 28 and 29 of the control member 19 accommodate two cylinders 40 and 41 having screwthreaded ends 42 and 43 which are entered into correspondingly screwthreaded bores 44 and 45 respectively formed internally of the generally cylindrical portion 20. The bores 44 and 45 communicate respectively with further bores 46 and 47 that extend radially relatively to the line 21, the points at which the bores 46 and 47 (FIGURES 5 and 7) open onto the outermost surface of the portion 20 being closed by means of plugs 48. The bore 47 communicates with the groove 35 by way of a duct 49 and the bore 46 communicates with the groove 34 in a similar manner by way of a duct 50. Each of the cylinders 40 and 41 accommodates a corresponding capillary duct 51 wound in the form of an oval loop, the straight sides of the ovals extending substantially parallel to the line 21. One end of each capillary duct 51 is fastened in a bore formed in the corresponding screwthreaded cylinder end 42 or 43, the arrangement being such that communication between the cylinders 40 and 41 and the screwthreaded bores 44 and 45 is only possible by way of the capillary ducts 51 (see FIGURE 3). The opposite ends of the capillary ducts 51 open at the ends of the cylinders 40 and 41 remote from the portion 20, these ends of said cylinders being covered by mesh 52 (FIGURES 3 and 5) the openings in which have smaller cross-sectional areas than the cross-sectional areas of the capillary ducts 51.

The portions 20 and 23 of the port plate 19 are formed with two inwardly tapering holes 54 the open ends of which are located on the side of the portion 23 remote from the portion 20 (see FIGURES 5 and 7). One hole 54 communicates by way of a radial duct 55 whose end is closed by a plug 56 with a duct 57 (FIGURE 4) which opens into the groove 37. The other hole 54 communicates in a similar manner by way of ducts 58 and 60 with the groove 36, the end of the duct 58 being closed by a plug 59. Tapering pins 61 are entered into the mouths of the holes 54, each pin 61 being formed with a longitudinally extending bore into which one end of a capillary duct 62 is entered in sealing relationship. As can be seen in FIGURE 5, the two capillary ducts 62 are of elongated construction, the ends thereof remote from the pins 61 being fastened to a block 63 which is connected to the portion 23 of the control member 19 alongside the portion 25 by way of pins or studs 64. As can be seen in FIGURE 3, the capillary ducts 62 open into a chamber 65 in the block 63, the mouth of this chamber being covered by mesh 66 the cross-sectional areas of the openings in which are smaller than the cross-sectional areas of the capillary ducts 62.

The aforementioned circular groove 38 communicates with the side of the cylindrical portion 20 remote from the housing 3 by way of two ducts 67 (FIGURE 3) whose longitudinal axes are inclined to the line 21. The central recess 39 communicates with the outer curved surface of the portion 20 by way of a radial duct 68 (FIGURE 6). The generally cylindrical portion 20 of the port plate 19 is formed with two diametrically opposed blind holes 69 (FIGURES 5 and 6) and with a radially extending recess 70 (FIGURES 3, 4 and 5).

It can be seen in FIGURE 2 that the port plate 19 of the pump 1 and also a similar port plate 71 of the motor 2 are mounted in chambers 73 and 74 formed at relatively opposite ends of a block 72. The portion 23 of the port plate 19 is lodged in a part of the chamber 73 whose inner diameter matches the outer diameter of the portion 23, the circular groove 24 accommodating a sealing ring 75 which abuts against the inner surface of said part of the chamber 73. The two chambers 73 and 74 communicate with one another by way of a central bore 76 whose longitudinal axis coincides with the line 21. The portion 26 of the port plate 19 is lodged in a part of the bore 76 whose inner diameter matches the outer diameter of said portion. A sealing ring 77 is located in the circular groove 27 of the portion 26 and abuts against the innermost surface of the bore 76.

A pin 78 carried by the block 72 has its free end entered in the radial recess 70 formed in the portion 20 of the port plate 19. The two blind holes 69 accommodate helical compression springs 79 which bear between the bases of these holes and the bases of recesses formed in the facing end of the block 72. It should be noted that in order to be able to show both the pin 78 and springs 79 in FIGURE 2, the pin 78 has been displaced through an angle of 90° about the line 21 relative to its actual position. As will be evident from FIGURE 2, the springs 79 act to urge the side 22 of the port plate 19 into engagement with the flat surface which is formed on the housing 3. The dimensions of the portions 23 and 26 of the control member 19 and those of the parts of the chamber 73 in which said portions are lodged are such that the port plate 19 can move axially of the line 21 to a limited extent and also turn about axes extending transverse to the line 21 to a small extent. The port plate 71 of the pump 2 is mounted in a substantially identical manner in the chamber 74 and it will be noted that, when the two port plates 19 and 71 are in their operative positions, communication is closed between the chambers 73 and 74 and the central bore 76. Nevertheless, the chambers 73 and 74 still communicate with one another by way of ducts 80 which are formed in the block 72 around the central bore 76.

In the use of the hydraulic transmission which has been described, the shaft 4 is rotated in the direction indicated by the arrow A in FIGURE 1 by some source of rotary power such as, for example, an internal combustion engine. When the swash plate 12 occupies the angular setting shown in FIGURE 1, the plungers 10 will not be axially displaced in the chambers 9 but, upon changing the angular setting of the swash plate 12 by turning it about the pivots or the like by which it is connected to the frame 6 in the direction indicated by the arrow B, the plungers 10 will be caused to reciprocate in their chambers 9 as long as the rotation of the shaft 4 continues. Thus, during a part of each stroke of each plunger 10, said plunger will pump a quantity of liquid, which will usually be oil, to the fluid pressure operated motor 2 by way of the ducts 18, the port 31, the ducts 30, the cylindrical bores 28 and 29 and the central bore 76. The swash plate of the motor 2 will occupy an angular setting in which it is inclined at an angle of other than 90° to the line 21 at such time so that, accordingly, its plungers will be caused to reciprocate in the chambers of its housing so that the latter will rotate. A flow of liquid will be produced from the motor 2 to the pump 1 by way of the ducts 80, the ducts 33 and the port 32. The pressure of the liquid flowing from the motor 2 to the pump 1 will be low relative to the pressure of the liquid flowing from the pump 1 to the motor 2.

Since the bores 28, 29 and 76 are all filled with liquid under pressure, some of this liquid will pass through the mesh 52 into the cylinders 40 and 41 from which it will pass to the bores 46 and 47 respectively by way of the two capillary ducts 51. The liquid which reaches the bores 46 and 47 passes by way of the ducts 49 and 50 to the grooves 35 and 34 respectively. Liquid under pressure in the chamber 73 reaches the grooves 36 and 37 in a similar manner by way of the mesh 66, the chamber 65, the capillary ducts 62, the holes 54, the ducts 55 and 58 and the ducts 57 and 60.

The pump 1 has seven plungers 10 and thus, during operation, either three or four of the plungers will be urging liquid towards the motor 2 while four or three of the plungers will be having their chambers 10 supplied with liquid returned from the motor 2. If the effective cross-sectional area of each plunger 10 is designated by the letter F and the pressure which is exerted on each plunger when the latter is disposed on the relatively high pressure side of the pump is designated by the letter P, then the plungers will exert a force on the housing 3 which will vary constantly between the value 3PF and the value 4PF. If, in a similar manner, the pressure exerted by each plunger on the relatively low pressure side of the pump 1 is designated by the letter P', then the plungers 10 located on that side of the pump 1 will exert a force on the housing 3 which will vary constantly between the value 3P'F and the value 4P'F. If the effective area of the portion 26 of the port plate 19 which is subjected to liquid pressure within the central bore 76 is designated by the letter F', then, in view of the fact that the central bore 76 is filled with liquid under the relatively high pressure P, said liquid will exert a force on the port plate 19 towards the housing 3 which will have a value F'P. The effective area of the portion 23 of the port plate 19 which is subjected to the relatively low liquid pressure existing in the chamber 73 is approximately the same as the area of the portion 26 which is subjected to the relatively high pressure existing in the central bore 76. Accordingly, the liquid in the chamber 73 exerts a pressure on the control member 19 in a direction towards the housing 3 whose value is approximately F'P'. The port plate 19 is preferably constructed in such a way that the area F' is equal to or slightly less than three times the area F.

The resultant of the forces acting on the port plate 19 in the direction of the housing 3 coincides with the line 21 and has a value of approximately $F'P+F'P'$. This force is always less by a relatively small amount than the previously discussed forces which the plungers 10 exert upon the housing 3 in a relatively opposite direction so that the port plate 19 together with the housing 3 will always be urged by a relatively small force in a direction towards the motor 2. This force is resisted by the frame 6 through the intermediary of the conical roller bearing 7.

During operation, a relatively small quantity of liquid constantly reaches the co-operating flat surfaces of the housing 3 and port plate 19 from the ports 31 and 32. Thus, since the port 31 forms part of the relatively high pressure side of the system, a force will be exerted on the port plate 19 in a direction towards the motor 2, said force having a value $fp$ considering the pressure exerted by the liquid in the region of said port to have a value $p$ and the area of application of said pressure to be $f$. It will be apparent that the force $fp$ will be applied to the port plate 19 at a location spaced from the line 21. In a similar manner, a force will be exerted by liquid reaching the port 32, which port forms a part of the relatively low pressure side of the system, said force having a value $f'p'$. It will be apparent that, since the pressures $p$ and $p'$ are substantially different, there will also be a substantial difference in the forces exerted on the control member in the regions of the ports 31 and 32 respectively. These forces $fp$ and $f'p'$ tend to tilt the port plate 19 slightly relative to the housing 3 and it is in order to avoid such tilting that the grooves 34 to 37 are provided.

It can be seen from the drawings that the grooves 34 and 35 form part of the relatively high pressure side of the system and are located on the same side of the plane $a'a$ as the relatively low pressure port 32 whereas, conversely, the grooves 36 and 37 which form part of the relatively low pressure side of the system lie on the same side of the plane $a'a$ as the relatively high pressure port 31. Liquid from the relatively high pressure grooves 34 and 35 will exert a force, which may be represented by the letter M, on the port plate 19 at a given distance from the line 21 while, similarly, liquid from the relatively low pressure ports 36 and 37 will exert a force, which may be represented by the letter N, on the port plate 19 at a similar distance from the line 21. By a suitable choice of the positions and dimensions of the grooves 34 to 37, the pressure which the liquid therefrom exerts on the port plate 19 can be varied. The dimensions of the capillary ducts 51 and 62 and other passages by which the main bodies of liquid under pressure communicate with the grooves 34 to 37 are preferably so chosen that the liquid pressure in a particular one of the grooves is approximately half the liquid pressure in the main body of liquid with which it communicates. The dimensions and arrangement which are chosen are such that the unequal forces M and N tend to tilt the port plate 19 and substantially exactly counterbalance the unequal forces $fp$ and $f'p'$ which tend to tilt the port plate 19 in a relatively opposite direction. Clearly, with this arrangement, the resultant of the four forces which have just been mentioned and which act upon the port plate 19 will coincide or substantially coincide with the line 21. It is important that no substantial tendency to tilt the port plate 19 relative to the housing 3 should exist since such tilting usually results in a direct metallic contact between the flat surfaces, such contact causing scratching and other damage which will reduce the efficiency of the transmission.

It will be apparent that the cross-sectional areas of the capillary ducts 51 and 62 influence the volume of liquid per unit time which reaches the grooves 34 to 37 during operation and, as a result, the clearance which exists between the flat surface of the housing 3 and the flat surface of the control member 19. The greater the clearance between these surfaces, the greater will be the amount of liquid per unit time which leaks out of the system but, since it is important to avoid direct metallic contact between the flat surfaces whilst they are moving relative to one another, a balance must be drawn between a state of too little clearance accompanied by a minimum of leakage and a state of excessive clearance with excessive leakage. A suitable choice of the dimensions of the various parts can readily be arrived at in any particular case whereby there is little, if any, danger of metallic contact during operation while the leakage is not excessive. Some of the liquid which leaks away from the system will pass directly to the circumferential edges of the parts 3 and 19 while further liquid will find its way to the outer walls of the control member 19 by way of the groove 38 and central recess 39 and the ducts 67 and 68 which communicate therewith. In the use of the hydraulic transmission in, for example, a vehicle, this liquid will drain into a reservoir from which it will be returned to the system by way of a supply pump.

The diameters of the flat surfaces of the housing 3 and port plate 19 may be small relative to the diameters of similar parts of known hydraulic transmissions and this, it will be realised, tends to reduce the losses attributable to friction. If the direction of rotation A of the shaft 4 is never reversed, then, in certain cases, it is only necessary to provide one or more recesses, such as the grooves 34 and 35, adjacent the port 32 on the relatively low pressure side of the system. The motor 2 is preferably constructed in a substantially identical manner, the operation of the various parts thereof being the same as that of the parts of the pump 1 which have already been described.

If desired, each pair of grooves 34, 35 and 36, 37 may be replaced by a single groove subtending an angle of nearly 180° at a line 21. However, it has been found that, under certain circumstances, the pressure varies slightly between the flat surfaces at locations at opposite ends of the port 31 and, for this reason, it is preferred to provide a pair of grooves on each side of the plane $a$—$a$ has been described.

If starting from the position illustrated in FIGURE 1, the swash plate 12 should be turned about its connection with the frame 6 in a direction opposite to the direction B, then the relatively high and relatively low pressure sides of the system will be interchanged and the motor 2 will be caused to rotate in a relatively opposite direction to the pump 1. The operation of the various parts which have been described will, however, remain substantially the same. The hydraulic transmission which has been described is one in which the longitudinal axes of the chambers 9 extend parallel to the common longitudinal axis and axis of rotation of the shaft 4. However, it will be apparent that substantially the same arrangements can be employed in a construction in which the longitudinal axes of the chambers 9 are inclined to the axis of rotation of the shaft 4.

The construction which has been described operates satisfactorily under most conditions but difficulties can arise under certain circumstances such, for example, as when the liquid pressure on the relatively high pressure side of the system is excessive compared with the liquid pressure on the relatively low pressure side of the system. Such difficulties tend to arise when, for example, the ratio between these pressures exceeds 10 to 1. The nature of these difficulties and various arrangements for avoiding them, or at least reducing them, will be explained with reference to FIGURES 8 and 9. Those parts of the transmission which have already been described are indicated in FIGURES 8 and 9 by the same reference numerals as previously employed.

FIGURE 8 is an elevation of the side 22 of the port plate 19 and, as will be seen by a comparison with FIGURE 4, the grooves 34 to 37 are replaced by four recesses in the form of grooves 81 to 84 each of which is substantially shorter in length than the corresponding one of the grooves 34 to 37. FIGURE 9 is an elevation showing the co-operating flat surface of the housing 3, said surface being intended to co-operate with the flat surface afforded by the side 22 shown in FIGURE 8. The mouths 86 to 92 of the seven ducts 18 which communicate with the chambers 9 can be seen in FIGURE 9, said mouths being surrounded by a ring of seven recesses in the form of arcuately curved grooves 93 to 99. The center of curvature of each of the grooves 93 to 99 coincides with the line 21, the grooves being equally spaced around this line and each one of them being in register with a corresponding one of the seven mouths 86 to 92. It will be evident from FIGURES 8 and 9 that the grooves 81 to 84 are spaced apart from the line 21 by the same distances as are the grooves 93 to 99. Moreover, the distance between the neighbouring ends of the grooves 81 and 84 and the neighbouring ends of the grooves 83 and 82 is greater than the length of any single one of the identical grooves 93 to 99. On the other hand, the distance between the neighbouring ends of the grooves 81 and 82 and that between the neighbouring ends of the grooves 83 and 84 is a little less than the length of each of the grooves 93 to 99.

If, during use of the transmission, the housing 3 rotates in the direction indicated by the arrow A in FIGURE 9, the flat surface thereof will move relative to the side 22 of the control member 19 in the direction indicated by the arrow D in FIGURE 8. At the instant at which the mouth 86 has just established communication with the relatively high pressure port 31, the major part of said mouth is still in register with the wall formed between the ports 31 and 32. The mouths 91 and 92 will be fully in register with the port 31 while the mouth 90 will be moving out of register with the port so that a large proportion of its cross-sectional area will be in alignment with the wall disposed between the ports 31 and 32. All four of the ducts 18 having the mouths 86 and 90 to 92 respectively will form part of the relatively high pressure side of the system and it will be apparent that areas of the wall of the port plate 19 at opposite ends of the port 31 will be subjected to substantially the same pressure as is the port 31 itself. Upon subsequent rotation of the housing 3 in the direction A, the mouths 86 to 92 will all move relative to the port plate 19 so that the area around the port 31 which is subjected to the liquid pressure in the ducts 18 communicating with the mouths 86 and 90 to 92 will also move in the direction D. This will, of course, cause a change in the point of application of the resultant of the forces acting on the port plate 19.

At the latter instant, the mouth 90 will turn out of communication with the port 31 and will, instead, come into communication with the relatively low pressure port 32. Only the three mouths 86, 91 and 92 will be in communication with the port 31 at this instant so that, obviously, the area of application of liquid pressure to the port 31 will be decreased relative to the area at the immediately preceding instant. The point of application of the resultant will, accordingly, be displaced temporarily in a direction opposite to the direction D. As soon as the housing 3 has turned somewhat further in the direction A, the mouth 87 will establish communication with the port 31 so that the original state described above will be re-established. It will be clear from what has just been described that an area of application of pressure to the port 31 exists which is unchanging in position and extent while, at the same time, a somewhat smaller area of application of pressure exists which is constantly and progressively changing its position of application from one end of the port 31 to the other and back again. It is this constantly changing smaller area which causes a corresponding change in the point of application of the resultant of the forces acting on the port plate 19. It will be evident that, in a substantially identical way, the point of application of the resultant of the forces acting on the port plate 19 and associated with the relatively low pressure port 32 will be continuously changing.

In order that the overall resultant shall always be applied at a point coinciding with, or very close to, the line 21, it is desirable that the constantly shifting forces which have just been discussed should be counterbalanced by other constantly shifting forces and it is to this end that the grooves 93 to 99 are provided. At the instant at which the mouth 86 first establishes communication with the port 31, the groove 93 first establishes communication with the groove 84 which grove is already in communication with the groove 99. In a similar manner, the groove 83 communicates with both the grooves 97 and 98. The groove 81 communicates with the single groove 94 and the groove 82 with the two grooves 95 and 96. In a similar manner to the embodiment which has already been described, the grooves 83 and 84 communicate by way of the capillary ducts 62 with the port 32 whereas the grooves 81 and 82 communicate by way of the capillary ducts 51 with the port 31. Accordingly, liquid is supplied to the grooves 83 and 84 at a substantially lower pressure than that which is supplied to the grooves 81 and 82.

Liquid from the grooves 83 and 84 will be fed to the grooves 97, 98 and 93, 99 respectively at the instant of operation mentioned above. Similarly, liquid from the grooves 81 and 82 will be fed to the grooves 94 and 95, 96 respectively. Obviously, liquid in each groove will apply a pressure to the port plate 19 and the regions of application of such pressures will turn about the line 21 as the housing 3 turns relative to the port plate 19. At the instant at which the mouth 90 moves into register with the wall dividing the ports 31 and 32, the groove 97 moves into register with the wall dividing the grooves 82 and 83. Immediately, afterwards, the groove 97 comes into register with the groove 82 and is, of course, no longer in register with the groove 83. At the same time, only the mouths 86, 91 and 92 are in communication with the port 31 while the grooves 94, 95, 96 and 97 are in communication with the port 31 by way of the grooves 81 and 82. The grooves 93 and 99 are in communication with the groove 84 and the groove 98 is in communication with the groove 83. Obviously, a relatively high pressure will be applied to the port plate 19 in the regions of the four grooves 94 to 97 while a relatively low pressure will be applied to the port plate in the regions of the three grooves 93, 98 and 99. The resultant of the forces applied to the port plate 19 from the grooves 94 to 97 will have changed in magnitude and shifted in position as compared with the resultant of the forces exerted on the port plate 19 and associated with the grooves 94 to 96 only. The change of the groove 97 from the relatively low to the relatively high pressure side of the system means that the first-mentioned resultant has shifted in position in a direction opposite to the direction D.

To sum up, the arrangement is such that, when three of the seven duct mouths 86 to 92 are in register with the port 31, four of the seven grooves 93 to 99 are also in communication with the port 31. Conversely, when four of the said mouths are in communication with the duct 31, three of the said grooves are also in communication therewith. In each case, the duct mouths and grooves are located substantially wholly on relatively opposite sides of the plane $a$—$a$. Obviously, exactly the same considerations apply to the duct mouths and grooves which communicate with the relatively low pressure port 32. By a suitable choice of the size and position of the grooves 81 to 84 and 93 to 99, it can be ensured that the overall resultant of the forces which act upon the port plate 19 is applied to that member at a point coinciding with, or very close to, the line 21 so that very little, if any, tendency will ever exist for the port plate 19 to tilt relative to the housing 3. Even if the housing 3 should be formed with an even number of ducts 18 instead of the odd number which has been described, the forces which act upon the port plate 19 will vary continuously in position and magnitude and such variation can be substantially counterbalanced in the same general manner as has been described provided that the correct dimentions and positions are chosen for the various grooves.

FIGURE 10 corresponds generally to FIGURE 1 and shows an alternative arrangement for rotatably supporting the shaft 4 and housing 3 of the pump 1. The end 100 of the shaft 4 is conically tapered and is inserted into a correspondingly tapered hole 101 formed centrally of the housing 3. A bolt 102 is entered in a screwthreaded bore formed centrally of the end 100 to secure the housing 3 to the shaft 4. The shaft 4 is formed with a shoulder 103 at the side of the swash plate 12 remote from the housing 3. A conical roller bearing 104 bears against one side of this shoulder and is mounted in a hole in the frame 6. A cover 105 secured to the frame 6 encloses the bearing 104 at the side thereof remote from the shoulder 103. As can be seen by a comparison with FIGURE 1, the conical roller bearing 104 is reversed in position on the shaft 4 relative to the position of the previously described conical roller bearing 7. In the embodiment which has already been described, the portions 23 and 26 of the port plate 19 are dimensioned in such a way that the value F' is equal to, or slightly smaller than, the value 3F. However, in this case, the construction of the portions 23 and 26 is such that the value F' is approximately equal to, or slightly in excess of, a value 4F, that is to say, greater than half the total effective cross-sectional area of all the plungers 10 plus 1. Accordingly, during operation of the transmission, the housing 3 is subjected to a constant relatively small force acting in a direction away from the motor 2, said force being resisted by the frame 6 through the intermediary of the conical roller bearing 104. This is an advantageous arrangement when the housing 3 is releasably secured to the shaft 4 in the manner shown in FIGURE 10 since said force constantly urges the conical parts 100 and 101 into mating engagement with one another.

FIGURE 11 illustrates a further alternative method of rotatably supporting the shaft 4 relative to the frame 6. In this case, the shaft 4 is formed with a shoulder 108 alongside which is mounted a double thrust ball race 106, that is to say, a ball race constructed to resist axial thrusts acting in either of two opposite directions. A nut 107 mounted on a screwthreaded portion of the shaft 4 encloses the inner member of the ball race 106 between itself and the shoulder 108 while an annular plate 107A bolted to the frame 6 acts in a similar manner to enclose the outer member of the ball race 106 between itself and a relatively spaced shoulder of the frame 6.

When the construction is employed, the portions 23 and 26 are preferably constructed so that the value F′ is approximately equal to a value 3½F, that is to say, a value approximately equal to half the effective cross-sectional area of all the plungers 10. During operation of the hydraulic transmission, constantly varying but relatively very small axial forces will act on the bearing 106 in relatively opposite directions.

FIGURES 12 and 13 correspond to FIGURES 8 and 9 respectively but show a further alternative construction for the co-operating flat surfaces of the housing 3 and control member 19. Those parts which have the same construction as parts already described are designated by the same reference numerals as previously employed. As can be seen in FIGURE 12, the circular groove 38 is replaced by two arcuately curved grooves 109 and 115 which grooves are arranged symmetrically with respect to the plane $a$—$a$ and are interconnected at their opposite ends by two relatively narrow channels 110 and 111 both of which extend perpendicular to the plane $a$—$a$. The perpendicular distances between the channels 110 and 111 and the line 21 are therefore less than the perpendicular distances between the grooves 109 and 115 and the line 21.

A somewhat larger unbroken area of the flat surface is obtained between the neighbouring ends of the groove 82, 83 and between the ends of the groove 81, 84 than in the embodiment described with reference to FIGURES 8 and 9. Accordingly, a greater area of application of the liquid under pressure from the grooves 81 to 84 is available in these regions and it has been found that this is advantageous in certain cases.

The construction of the flat surface of the housing 3 which is shown in FIGURE 13 may be employed sucessfully with the construction of the flat surface of the port plate 19 which is shown in FIGURE 12 but it should be noted that the construction shown in FIGURE 13 is suitable for use with other constructions of the port plate 19 such as, for example, the construction shown in FIGURE 8. It can be seen from FIGURE 13 that each one of the grooves 93 to 99 illustrated in FIGURE 9 is replaced by two grooves 112 and 113 which are both arcuately curved about the line 21. However, each groove 113 is located radially further away from the line 21 than is each groove 112, each pair of grooves being interconnected by a relatively wide intermediate portion 114. Thus, as will be apparent from FIGURE 13, each series of three parts 112, 113 and 114 forms a single recess having portions which are relatively spaced radially of the line 21. The advantage of this construction is that, in the event of scratching or similar damage occurring to the flat surface of the housing 3, the recesses which have just been described will be brought into communication with one another considerably less easily than in the case of the construction illustrated in FIGURE 9. If dirt enters one of the grooves, it will collect at the foremost end thereof relative to the direction of rotation of the housing 3 and may, during operation, intrude between the co-operating flat surfaces of the two parts 3 and 19. If a piece of dirt of sufficient hardness to scratch the metal should intrude between the surfaces in this way, it will almost invariably cause a surved scratch whose center is concentric with the line 21.

It will be apparent from a comparison of FIGURES 9 and 13 that a scratch of the kind just discussed will connect, for example, the grooves 93 and 94 much more readily than two of the grooves 112 shown in FIGURE 13 since the distance involved in the latter case is substantially greater. It is important to prevent the concurrence of scratches and similar damage since, when the grooves come into unwanted communication with one another in the manner which has just been described, the efficacy of these grooves in maintaining the resultant of the forces acting upon the control member 19 substantially coincident with the line 21 is impaired.

Referring to the drawings, the pump which is illustrated comprises a housing 116 which is rigidly secured to one end of a shaft 117. The housing 116 is rotatably mounted in a frame 118 with the aid of needle bearings 119. Seven cylindrical chambers in the form of bores 120 are provided in the housing 116 so as to extend parallel to, and equidistant from, the longitudinal axis of the shaft 117. Each bore 120 accommodates a cylindrical plunger 121 which is slidable axially of that bore and which has domed heads at its opposite ends. One of each plunger 121 projects from the corresponding bore 120 and these seven ends, in common, bear against one side of a ring 122 forming part of a swash plate which is generally indicated by the reference numeral 123. The swash plate 123 also includes a support 124 which is connected to a frame (not shown) in such a way as to be turnable about an axis intersecting and extending perpendicular to the longitudinal axis of the shaft 117.

The support 124 is formed with a recess against the base of which abuts a hardened annulus 125. The rear side of the ring 122 bears against the annulus 125 through the intermediary of a series of rollers 126 while its radially outermost edge bears against the cylindrical wall of the recess in the support 124 through the intermediary of a series of rollers 127. The arrangement is such that, when the various parts occupy the positions shown in FIGURE 14 in which the plane which contains all the points of contact between the seven plungers 121 and the ring 122 is disposed perpendicular to the longitudinal axis of the shaft 117, the longitudinal axis of each roller 127 extends parallel to the longitudinal axis of the shaft 117 which axis also affords the axis of rotation of the shaft and the housing 116.

A duct 128 communicates with the end of each bore 120 remote from the swash plate 123, each duct 128 opening into a duct 129 of somewhat greater diameter. The duct 129 opens onto a flat surface of the housing 116 which surface is adapted to contact, or to lie in close proximity to, a further flat surface formed on a relatively fixed port plate which is generally indicated by the reference numeral 130. The port plate 130 is formed with two ports 131 and 132 (FIGURE 15) each having the shape of a curved slot. The centers of curvature of the two ports 131 and 132 approximately coincide with the longitudinal axis of the shaft 117. As can be seen in FIGURE 14, the port plate 130 is rigidly secured to the frame 118 which surrounds the housing 116. The arrangement is such that the housing 116 can move to a limited extent in the axial direction of the shaft 117 whereby the aforementioned flat surfaces formed on the housing 116 and port plate 130 can either contact one another or lie in close proximity to one another.

Two recesses in the form of arcuately curved grooves 134 and 135 are formed in the flat surface of the port plate 130, these grooves being concentric with the ports 131 and 132. Moreover, as will be evident from FIGURE 15, the grooves 134 and 135, and also the ports 131 and 132, are disposed symmetrically with respect to a plane A—A which plane contains the longitudinal axes of the housing 116, the shaft 117 and the port plate 130 and thus the axis about which the housing 116 and shaft 117 are rotatable relative to the port plate 130. The port 131 and groove 134 are located on one side of the plane A—A while the port 132 and groove 135 are located symmetrically on the opposite side of the plane. None of the parts 131, 132, 134 and 135 are in communication with one another at the flat surface of the port plate 130.

A circular groove 136 whose center of curvature is concentric with the centers of curvature of the parts 131, 132, 134 and 135 is formed in the flat surface of the port plate 130 between the ports 131 and 132 and the grooves 134 and 135. Moreover, a circular recess 137 is formed centrally of the said surface between the ports 131 and 132. The circular groove 136 communicates by way of two ducts 138 with the space which surrounds the cylindrical wall of the port plate 130 and the circular recess 137 is also in communication with this space by way of a single duct 139.

Two further ducts 140 and 141 whose longitudinal axes are contained in the plane A—A extend perpendicular to the flat surface of the port plate 130 and communicate with relatively perpendicular ducts 142 and 144 respectively. The duct 142 is in communication with the groove 134 by way of a duct 143 and the duct 144 communicates in a similar manner with the groove 135 by way of a duct 145. The ends of the ducts 142 and 144 remote from the ducts 140 and 141 respectively are closed by plugs 146.

The radially outermost side (with respect to the longitudinal axis of the shaft 117) of each duct 129 is formed with a recess 147 (FIGURES 14 and 16), each such recess 147 being spaced from the longitudinal axis of the shaft 117 by the same distance as are the mouths of the ducts 140 and 141 from the common longitudinal axis of the port plate 130.

In the use of the pump which has been described, the shaft 117 is rotated about its own longitudinal axis in the direction indicated by the arrow C in FIGURE 14. While the parts occupy the position illustrated in FIGURE 14, no reciprocation of the plungers 121 in the bores 120 will be caused but, as soon as the swash plate 123 is turned in the direction indicated by the arrow B, the plungers 121 which are in contact with the ring 122 will be compelled to reciprocate in the bores 120. Liquid under a relatively low pressure will be drawn from the port 132 into certain of the bores 120 by way of the ducts 128 and ducts 129, which latter register with the ports 131 and 132, while liquid from other bores 120 will be fed to the port 131 at a relatively high pressure. Twice during each revolution of the shaft 117 and housing 116 each plunger 121 reaches a position at which its longitudinal axis is contained in the plane A—A. Since the axis about which the support 124 of the swash plate 123 is turnable extends perpendicular to the plane A—A, a plunger 121 will occupy a "dead" position at one or other end of its stroke in the corresponding bore 120 at each such instant. Moreover, at each such instant, the bore 120 containing the plunger 121 which is concerned will be in communication with either the duct 140 or the duct 141 by way of the corresponding ducts 128 and 129 and recess 147. Due to the fact that, in the "dead" positions of the plungers 121, the liquid contained in the corresponding bores 120 is under a certain pressure, this pressure will be relieved by a very slight expansion of the liquid, the displaced liquid reaching the grooves 134 and 135 from which it is urged onto the contacting or very closely adjacent flat surfaces of the housing 116 and port plate 130. In this manner, a lubricating film of the liquid, which will almost always be oil, is maintained between the two flat surfaces.

The arrangement which has been described enhances the efficiency of the pump. In a conventional pump of this kind, liquid under relatively high pressure is contained in each bore 120 as that bore moves out of register with the outlet port 131 and subsequently into register with the inlet port 132. The potential energy of the compressed liquid is thus wasted by expansion as each bore comes into register with the inlet port 132 which contains liquid under a relatively low pressure. The arrangement in accordance with the invention allows the potential energy of the compressed liquid in the bores 120 to be dissipated in supplying lubricant to the relatively moving flat surfaces of the housing 116 and control member 130. Any excess of lubricating liquid which arises between the two flat surfaces finds its way into either the circular recess 137 or the circular groove 136 from which it passes to the exterior of the port plate 130 by way of the ducts 138 and 139. The port plate 130 is usually disposed within a casing containing a liquid reservoir which the liquid displaced in the manner just described will reach under gravity.

The arrangement shown in FIGURE 17 is the same as that shown in FIGURE 15 except that the ducts 140 and 141 which are of circular configuration are replaced by slot-shaped ducts 148. Each duct extends laterally of the plane A—A in a direction opposite to the direction in which the housing 116 rotates relative to the port plate 130, that is to say, a direction opposite to the direction C (FIGURE 14). Accordingly, each recess 147 comes into register with one of the slot-shaped ducts 148 immediately before the corresponding plunger 121 reaches one of its two "dead" positions. The delivery of lubricating liquid to the flat surfaces of the housing 116 and port plate 130 is thus enhanced by ensuring that a very small fraction of each stroke of each plunger 121 is utilised to positively urge the liquid towards the grooves 134 and 135.

Although the foregoing description has been directed to a pump, it will be apparent that the features of the invention can equally well be applied to a liquid-pressure operated motor of the same general kind. It will also be apparent that it is not essential that the longitudinal axes of the bores 120 and plungers 121 should extend parallel to the longitudinal axis of the shaft 117 affording the axis of rotation of the housing 116.

What we claim is:

1. A hydraulic pump comprising a rotatable housing and a port plate, said housing and port plate having abutting surfaces, said port plate having two ports located on relatively opposite sides of a plane containing the axis of relative rotation, one port being arranged to hold liquid under a relatively high pressure during operation and the other being arranged to hold liquid under a relatively low pressure, said housing having a plurality of chambers containing reciprocating plungers, each chamber communicating with the surface of the housing by way of a passage, the mouth of each passage of said surface being formed with a projecting recess located on a radial side of said mouth with respect to the axis of relative rotation, a duct in said port plate which opens onto the said surface being so arranged that during a period in which a chamber is in communication with neither of said ports during operation, the recess associated with the mouth of the corresponding passage communciates with said duct opening onto the surface of the port plate, said duct being in communication by way of a further duct with a further recess provided in one of said surfaces, whereby a chamber is in communication with the first mentioned duct via the corresponding passage and the recess associated with the mouth of said corresponding passage and liquid passes from the chamber to the further recess.

2. A pump as claimed in claim 1, wherein the duct, which opens onto the surface of the port plate extends laterally of said plane over a predetermined distance in a direction opposite to the direction in which the housing rotates relative to the port plate during operation.

3. A pump as claimed in claim 1 wherein two ducts are provided with openings onto one of said surfaces, the ducts being arranged symmetrically with respect to the axis of relative rotation, one duct being in communication with a recess formed in one of said surfaces and located on one side of said plane, whereas the other duct is in communication with a further recess formed in one of the surfaces and located on the opposite side of said plane.

4. A pump as claimed in claim 3, wherein each recess which is in communication with a corresponding duct opening onto the surface of the port plate is located, considered in the direction of rotation of the housing relative to the port plate during operation, rearwardly of the mouth of said duct.

5. A pump as claimed in claim 3, wherein each recess is formed in the surface of the port plate.

6. A pump as claimed in claim 3, wherein each recess takes the form of a curved groove whose center of curvature substantially coincides with the axis of relative rotation.

7. A pump as claimed in claim 6, wherein at least two grooves are provided, said grooves being arranged symmetrically with respect to said plane.

8. A hydraulic motor comprising a rotatable housing and a port plate, said housing and port plate having abutting surfaces, said port plate having two ports located on relatively opposite sides of a plane containing the axis of relative rotation, one port being arranged to hold liquid under a relatively high pressure during operation and the other being arranged to hold liquid under a relatively low pressure, said housing having a plurality of chambers containing reciprocating plungers, two ducts being provided which open onto one of said surfaces, said ducts being arranged symmetrically with respect to the axis of relative rotation, one duct being in communication with a recess formed in one of the surfaces and located on one side of said plane, the other duct being in communication with a further recess formed in one of the surfaces and located on the opposite side of said plane, whereby during a period in which a chamber is in communication with neither of said ports, said chamber communicates with one of said ducts and discharges liquid via said one duct into the corresponding recess.

9. A hydraulic pump comprising a rotatable housing and a port plate, said housing and plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port on the opposite side containing relatively low pressure liquid, at least one recess being formed in one of said surfaces on each side of said plane, a first circuit connecting one of said recesses to said low pressure port and liquid, and a further circuit connecting the other recess to said high pressure port and liquid, a central recess between said high pressure and said low pressure ports, said central recess being in open communication with the peripheral wall containing said port plate, a groove between said recesses, said groove being in open communication with the peripheral wall containing said port plate.

10. A pump as claimed in claim 9, wherein the groove has portions disposed closer to said axis of rotation than further portions of said groove.

11. A pump as claimed in claim 9 wherein at least two recesses are formed on each side of said plane in the surface of the port plate and wherein said recesses are formed by curved grooves which lie upon the same circle, whose center coincides with the axis of rotation, two of said curved grooves on a first side of said plane being connected with the high pressure port and the other two curved grooves located on the other side of said plane being connected with the low pressure port.

12. A hydraulic pump comprising a rotatable housing and a port plate, said housing and plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port containing relatively low pressure liquid, one of said ports communicating with a cylindrical bore within said plate, said bore having a longitudinal axis which approximates said axis of rotation, the other of said ports communicating with a part of the side of the port plate which is opposite to said surface, the outer periphery of said part of the port plate extending concentrically around said axis of rotation.

13. A pump as claimed in claim 12 wherein the cross-sectional area of said part of the port plate opposite to said surface and the cross-sectional area of an opening which communicates with said bore is about equal to the total effective cross-sectional areas of half the number of plungers located in said housing.

14. A pump as claimed in claim 12 wherein the cross-sectional area of the opening at the side of said plate is about equal to the total effective cross-sectional areas of half the number of plungers.

15. A hydraulic pump comprising a rotatable housing and a port plate, said housing and plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port on the opposite side of said plane containing relatively low pressure liquid, at least one recess being formed in one of said surfaces, liquid being fed to said recess by a circuit, said circuit including a capillary duct.

16. A pump as claimed in claim 15, wherein the circuit includes a capillary duct arranged within a cylinder, said cylinder being positioned within a bore in communication with one of said ports.

17. A pump as claimed in claim 16, wherein the mouth of the cylinder is covered by mesh having holes, said holes having smaller cross-sectional areas than the cross-sectional area of said duct.

18. The pump of claim 15, wherein the capillary duct communicates with a chamber within a block, said block being positioned within a space in communication with one of said ports.

19. The pump of claim 18, wherein the mouth of the chamber is covered by mesh having holes, said mesh having smaller cross-sectional areas than the cross-sectional areas of said duct.

20. A pump as claimed in claim 15, wherein each duct is of looped formation.

21. A pump as claimed in claim 20, wherein each loop lies substantially parallel to the axis of rotation.

22. A pump as claimed in claim 21, wherein each loop is of curved formation and each center of curvature coincides with said axis of rotation.

23. A pump as claimed in claim 15, wherein a swash plate is provided and the swash plate includes a ring whose periphery is supported by a series of rollers, the arrangement being such that the ring contacts the plungers and the longitudinal axes of said rollers extend perpendicular to a plane containing the points of contact.

24. A pump as claimed in claim 23, wherein the ring is supported by a further series of rollers whose longitudinal axes extend substantially perpendicular to the longitudinal axes of the first-mentioned series of rollers.

25. A pump as claimed in claim 15, wherein a swash plate is provided and the swash plate includes a ring which contacts the plungers, the ring being supported by a series of rollers whose longitudinal axes extend substantially parallel to a plane containing the points of contact, the rollers being arranged in groups in each of which groups the longitudinal axes of the rollers are substantially coincident and the arrangement being such that the common longitudinal axes of the rollers of the various groups intersect at a point substantially coincident with said axis of rotation.

26. A hydraulic pump comprising a rotatable housing and a port plate, said housing and plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port on the opposite side containing relatively low pressure liquid, at least one recess being formed in the surface of the port plate on each side of said plane, a first circuit connecting the recess on said one side to said low pressure port and liquid, and a further circuit connecting the other recess on said opposite side to said high pressure port and liquid, a plurality of additional recesses being formed in the surface of said housing, said additional recesses being equal in number to the plungers in said housing, at least parts of said first-mentioned recesses in the port plate being situated at the same distance from the axis of rotation as parts of said additional recesses in the surface of the housing and the distance along a curved path between two of said first-mentioned recesses in the surface of said port plate on opposite sides of said plane being greater than the curved length of one of said additional recesses formed in the surface of said housing.

27. The pump claimed in claim 26 wherein one of said additional recesses in the surface of said housing is arranged symmetrically with respect to a line connecting the axis of rotation and the center of the mouth of a bore wherein a plunger is located.

28. The pump claimed in claim 26 wherein in the surface of the port plate on one side of said plane two recesses are provided, the distance along a curved path between said two recesses being less than the curved length of either of said recesses.

29. The pump claimed in claim 26 wherein the distance between one end of a recess in said port plate and the axis of rotation is smaller than the distance betwen the other end of said recess and the axis of rotation.

30. A hydraulic pump comprising a rotatable housing and a port plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port on the opposite side of said plane containing relatively low pressure liquid, at least two recesses being formed in one of said surfaces, liquid being fed to said recesses by a circuit, one end of a first recess being located at a distance from said axis of rotation which is greater than the distance between the other end of said recess and the axis of rotation and which is also greater than the distance between the axis of rotation and the end of the other recess which end is located nearest to said first recess.

31. A pump as claimed in claim 30 wherein each recess comprises two parts which communicate with each other, each part being a curved groove whose center of curvature substantially coincides with said axis of rotation.

32. A hydraulic pump comprising a rotatable housing and a port plate having abutting surfaces movable relative to one another, the surface of said plate having at least two ports arranged substantially symmetrically on opposite sides of a plane containing the axis of rotation of said housing, a high pressure port on one side of said plane containing relatively high pressure liquid, a low pressure port on the opposite side of said plane containing relatively low pressure liquid, at least one recess being formed in one of said surfaces, liquid being fed to said recess, a groove in one of said surfaces extending substantially symmetrically around said axis of rotation, said groove lying between said recess and said ports, said groove being in communication with the peripheral wall of said port plate or of said housing and wherein said groove has portions disposed closer to said axis of rotation than further portions of said groove, each of said first-mentioned portions extending on both sides of said plane.

33. A pump claimed in claim 32 wherein said first-mentioned portions are straight and extend substantially perpendicular to said plane, said further portions which connect said straight portions being curved and having a center of curvature which substantially coincides with said axis of rotation.

References Cited by the Examiner

UNITED STATES PATENTS

| | | | |
|---|---|---|---|
| 2,307,719 | 1/1943 | Hawley | 103—162 |
| 2,553,655 | 5/1951 | Herman et al. | 103—162 |
| 2,804,828 | 9/1957 | Grad | 103—162 |
| 2,852,320 | 9/1958 | Cornelius | 308—174 |
| 2,891,419 | 6/1959 | Badalini | 103—162 |
| 2,972,962 | 2/1961 | Douglas | 103—162 |
| 3,018,145 | 1/1962 | Cornelius | 308—174 |
| 3,036,434 | 5/1962 | Mark | 60—53 |
| 3,040,672 | 6/1962 | Foerster et al. | 103—162 |
| 3,051,093 | 8/1962 | Budzich | 103—162 |
| 3,089,426 | 5/1963 | Budzich | 103—162 |
| 3,092,036 | 6/1963 | Creighton | 103—162 |

FOREIGN PATENTS 864,286  3/1961  Great Britain.

LAURENCE V. EFNER, *Primary Examiner.*